SPIN ECHO STORAGE TECHNIQUE

Filed July 14, 1954 6 Sheets-Sheet 1

INVENTORS
ARTHUR G. ANDERSON
ERWIN L. HAHN
BY
Van Deventer & Shively
ATTORNEYS

SPIN ECHO STORAGE TECHNIQUE
FIG. 3.
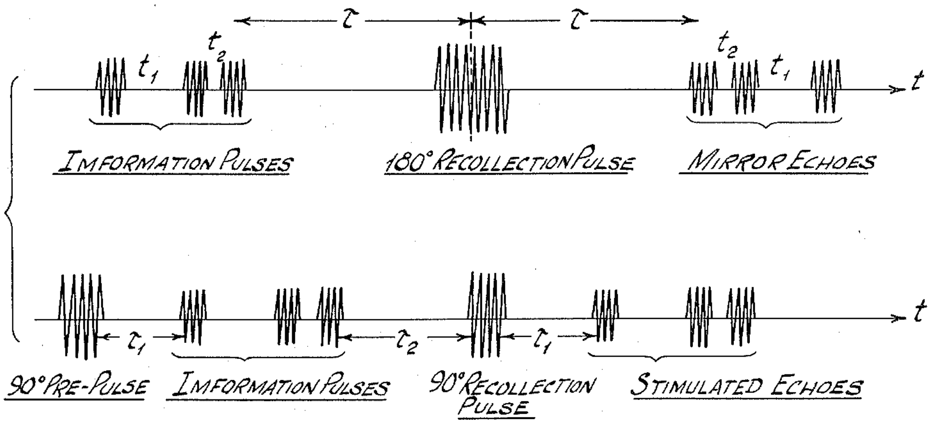
FIG. 4. FIG. 5.
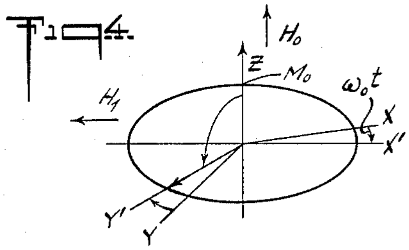
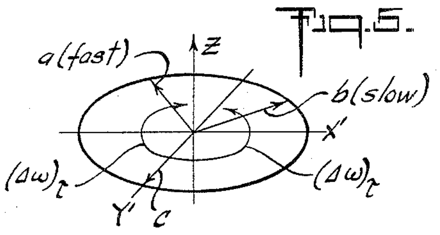
FIG. 6. FIG. 7.
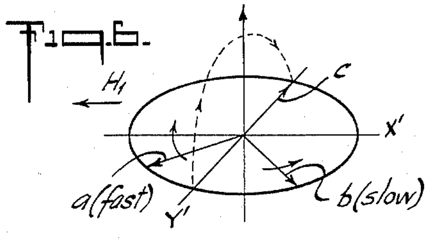
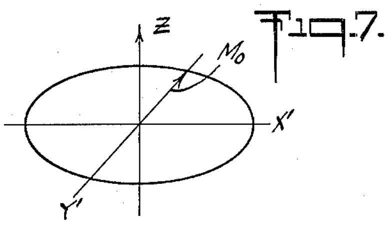
FIG. 8.
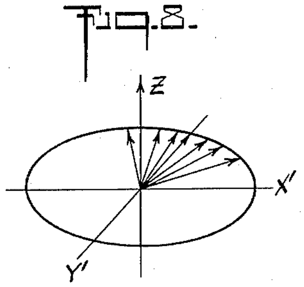
INVENTORS
ARTHUR G. ANDERSON
ERWIN L. HAHN
BY
Van Deventer & Shively
ATTORNEYS INVENTORS
ARTHUR G. ANDERSON
BY ERWIN L. HAHN
Van Deventer & Shively
ATTORNEYS INVENTORS
ARTHUR G. ANDERSON
ERWIN L. HAHN
BY
Van Deventer & Shively
ATTORNEYS

SPIN ECHO STORAGE TECHNIQUE

INVENTORS
ARTHUR G. ANDERSON
ERWIN L. HAHN
BY
Van Deventer & Shively
ATTORNEYS

INVENTORS
ARTHUR G. ANDERSON
ERWIN L. HAHN
BY
Van Deventer & Shively
ATTORNEYS

United States Patent Office 2,714,714
Patented Aug. 2, 1955

2,714,714

SPIN ECHO STORAGE TECHNIQUE

Arthur G. Anderson, Riverdale, N. Y., and Erwin L. Hahn, Bergenfield, N. J., assignors to International Business Machines Corporation, a corporation of New York Application July 14, 1954, Serial No. 443,216

9 Claims. (Cl. 340—173)

The present invention pertains to improvements in spin echo storage technique.

An object of the invention is to provide a spin echo memory method including the introduction of discriminator pulses for achieving selective production of either mirror type or stimulated echo signals from a single storage medium.

A further object is to provide a method of the above type by which spurious or undesirable inter-pulse echo signals are eliminated, whereby the precision, uniformity and strength of the desired echoes may be enhanced.

Spin-echo technique in general comprises a method of storing information in the form of electrical pulses applied to samples of suitable chemical materials, and subsequently recovering the information as "echo" pulses produced by free nuclear induction.

The phenomenon of free nuclear induction per se has been set forth in Patent No. 2,561,489 to F. Bloch et al., as well as in various well-known scientific publications by Bloch and by Purcell. The extension of the effect to produce spin echoes, the work of E. L. Hahn, was described by the latter scientist in an article entitled "Spin Echoes," published in Physical Review, November 15, 1950. Since the above publications are readily available in the public domain, repetition herein of the entire complex mathematical analysis contained in them is unnecessary. However, in order to set forth most clearly the nature and advantages of the present invention, it is appropriate first to describe briefly the pertinent general principles of spin-echo technique. In this explanation, and the succeeding exposition of the present invention, reference is made to the accompanying drawings, in which:

Figure 3 is a double time-sequence graph illustrating the distinction between mirror echo and stimulated echo effects;

Figures 12, 13, 14, 15, 16, 17:
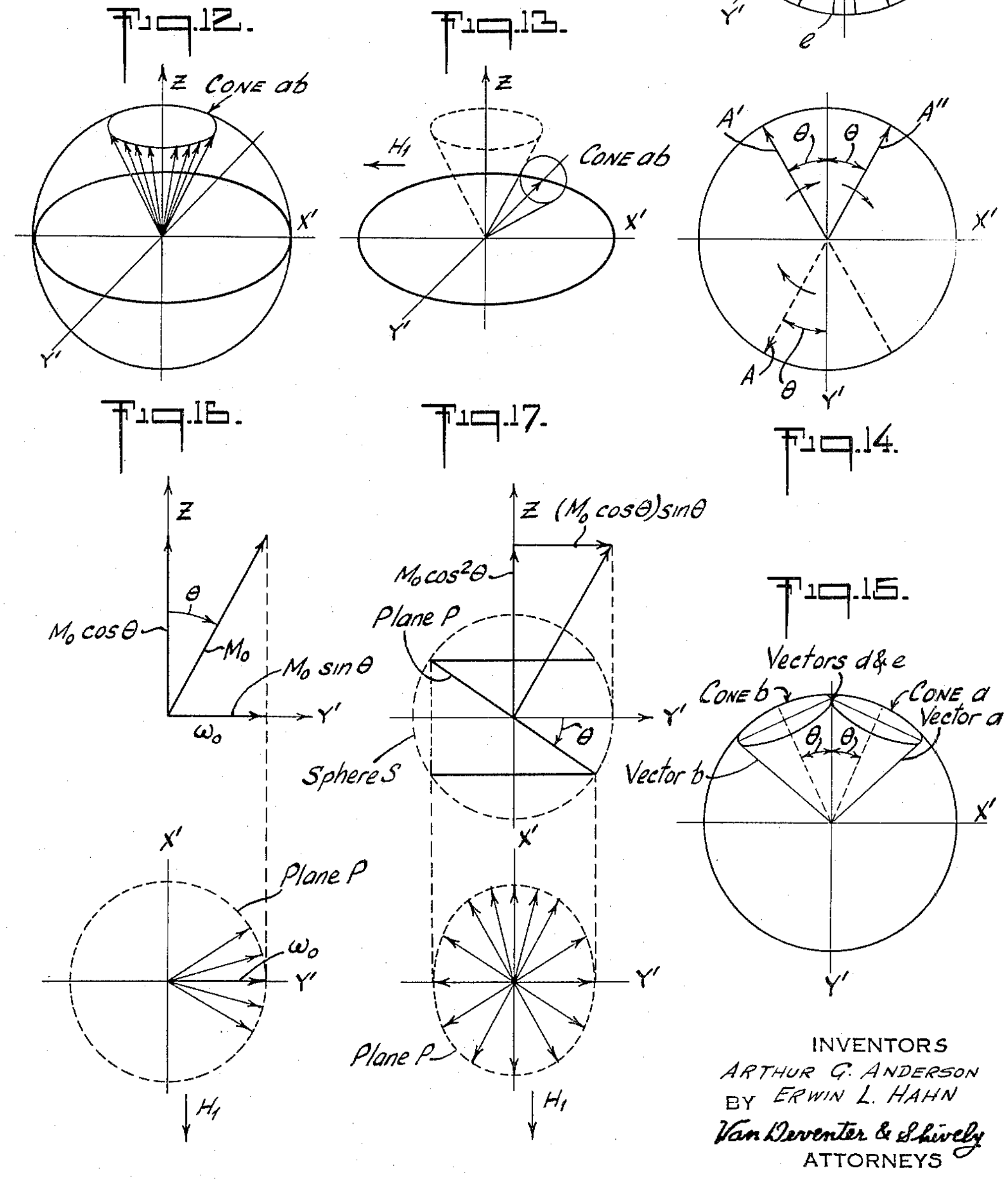
Figure 18A:
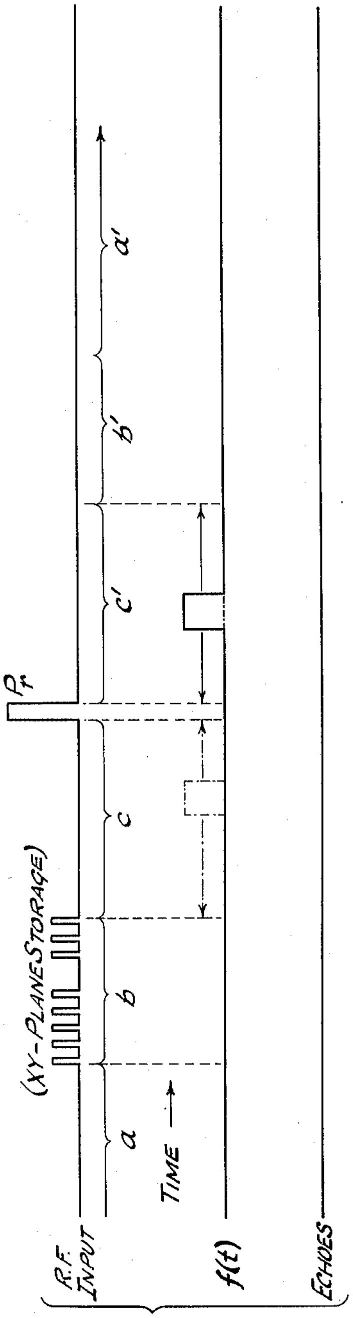
Figure 18B:
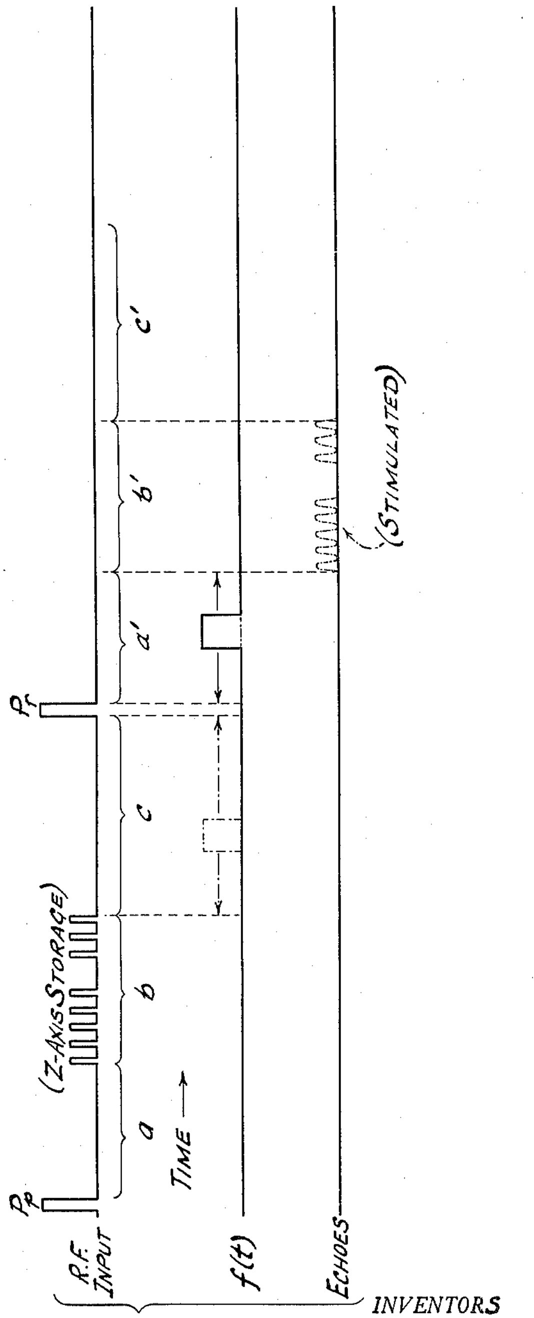

Figures 4, 5, 6, 7, and 8 illustrate diagrammatically the successive relationships assumed by nuclear magnetic moments throughout the production of mirror echoes;

Figures 9, 10, 11, 12, 13, 14 and 15 similarly illustrate successive moment relationships in stimulated echo production;

Figures 16 and 17 similarly represent moment behavior in multiple pulse storage and echo production;

Figures 18A and 18B are time diagrams illustrating the relations in which discriminator pulses may be employed to destroy mirror echo type and stimulated echo type storages respectively.

Figure 19A:
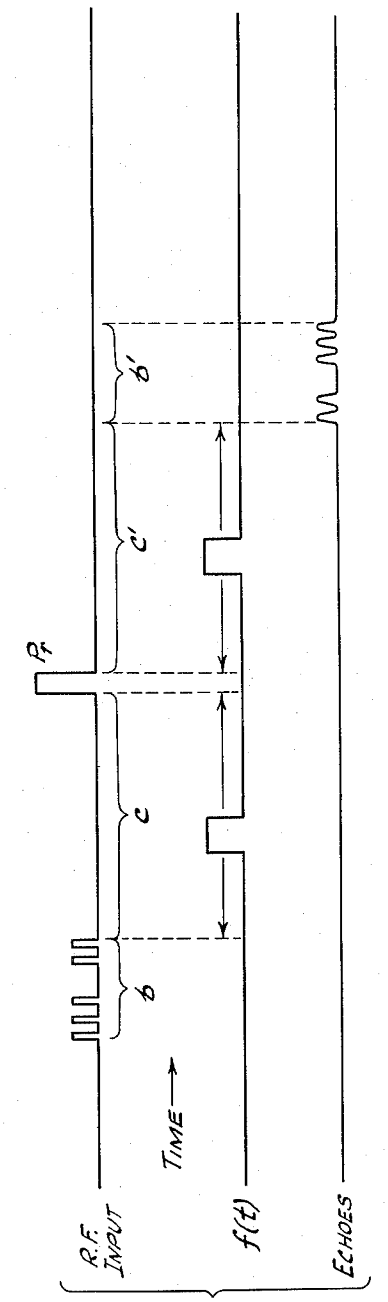
Figure 19B:
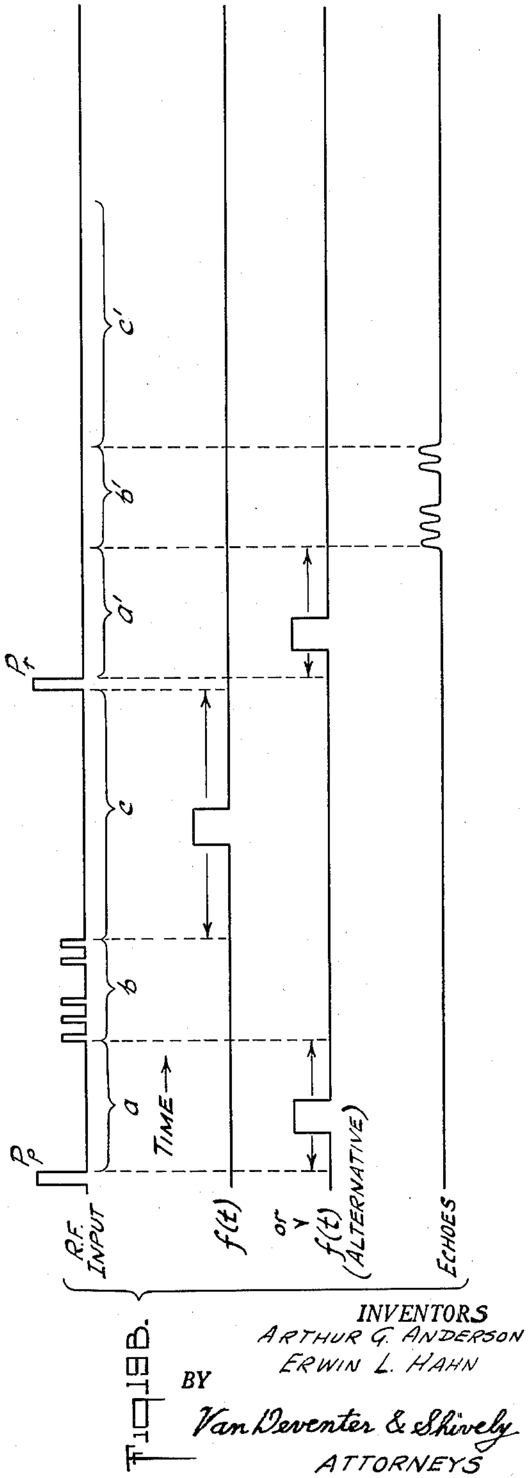
Figure 19C:
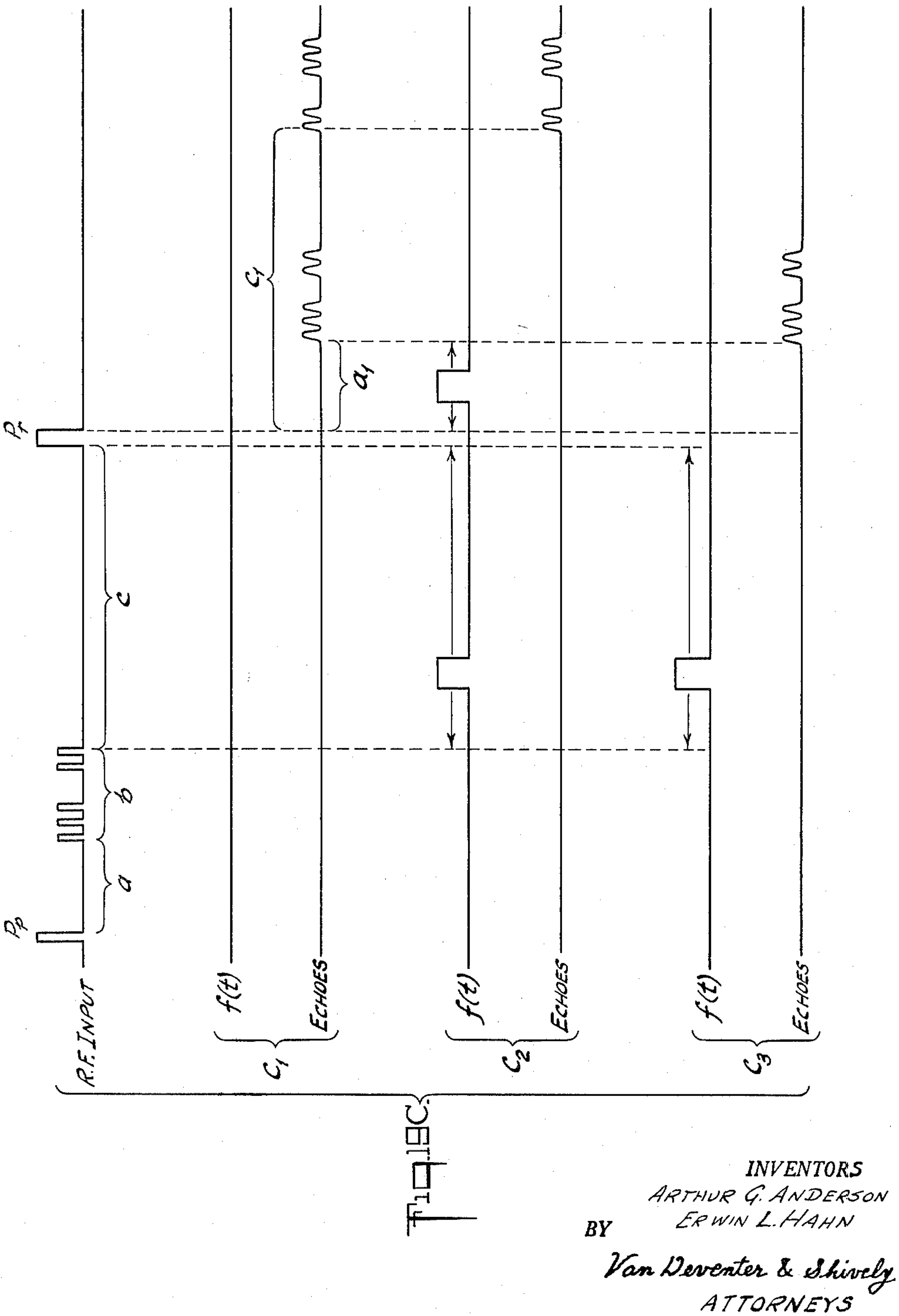

Figures 19A and 19B are similar parallel timing diagrams illustrating the use of discriminator pulses for selective exclusive preservation of mirror-type and stimulated echoes respectively; and Figure 19C illustrates a case in which it is possible to select, at recollection pulse time, either of the two types of echo.

Nuclear induction, while in itself a magnetic effect, is based on a combination of magnetic and mechanical properties existing in the atomic nuclei of chemical substances, good examples being the protons or hydrogen nuclei in water and various hydrocarbons. The pertinent mechanical property possessed by such a nucleus is that of spin about its own axis of symmetry, and as the nucleus has mass, it possesses angular momentum of spin and accordingly comprises a gyroscope, infinitely small, but nevertheless having the normal mechanical properties of this type of device. In addition, the nucleus possesses a magnetic moment directed along its gyroscopic axis. Thus each nucleus may be visualized as a minute bar magnet spinning on its longitudinal axis. For a given chemical substance, a fixed ratio exists between the magnetic moment of each nucleus and its angular momentum of spin. This ratio is known as the gyromagnetic ratio, and is normally designated by the Greek letter $\gamma$.

A small sample of chemical substance, such as water as previously noted, obviously contains a vast number of such gyroscopic nuclei. If the sample is placed in a strong unidirectional magnetic field these spinning nuclei align themselves with their magnetic axes parallel to the field, after the manner of a large gyroscope standing erect in the earth's gravitational field. In the aggregate, whether the various nuclear magnetic moments are aligned with or against the field is determined largely by chance, but while a large number aligned in opposite directions cancel each other, there always exists a net preponderance in one direction which for analysis may be assumed as with the field. Thus the sample, affected by the magnetic field, acquires a net magnetic moment $M_0$ and a net angular momentum $I_0$, which two quantities may be represented as the vector sums of the magnetic moments and spins of all the nuclei concerned.

So long as the sample remains undisturbed in the field, the gyroscopic nuclei remain in parallel alignment therewith as noted. If however, a force is applied which tips the spinning nuclei out of alignment with the main field, upon release of the displacing force the spinning nuclei, urged again toward realignment by the force of the field, rotate or precess about the field direction in the familiar gyroscopic manner. Precession occurs with a radian frequency $\omega_0=\gamma H_0$, where $H_0$ is the field strength affecting each nucleus and $\gamma$ is the previously noted gyromagnetic ratio. This precessional frequency $\omega_0$ is termed the Larmor frequency, and since for any given type of nuclei $\gamma$ is a constant (for example $2.68\times10^4$ for protons or hydrogen nuclei in water), it is evident that the Larmor frequency of each precessing nucleus is a direct function of the field strength affecting that particular nucleus. It will further be evident that if the field strength $H_0$ is of differing values in different parts of the sample, the groups of nuclei of these various parts will exhibit net magnetic moments precessing at differing Larmor frequencies.

Figure 1:
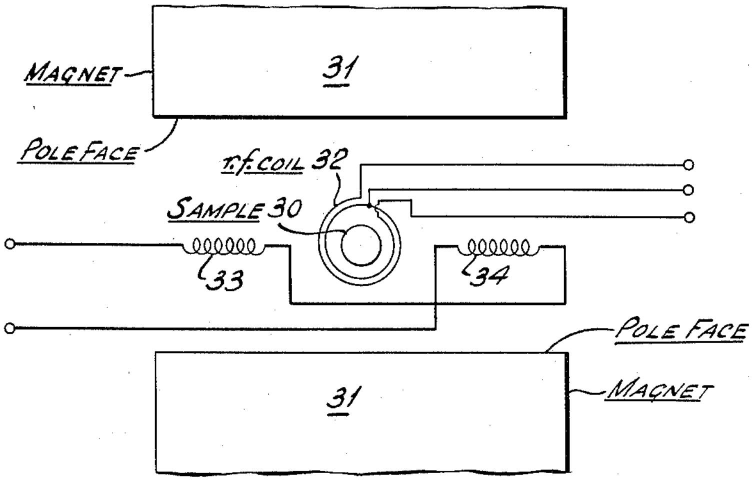
Figures 1 and 2 are joint diagrammatic illustrations of suitable apparatus for producing spin-echoes.

It is upon the above described characteristic of differential precession in an inhomogeneous field that the technique of spin-echoes is based. For clarity in the following general explanation, it is first appropriate to describe briefly an example of suitable apparatus for producing the effects, such apparatus being shown diagrammatically in Figures 1 and 2. Referring first to Figure 1, the numeral 30 designates a sample of chemical substance, for example water or glycerine, in which information is to be stored. The sample 30 is disposed between the pole faces of a magnet 31, preferably of the permanent horn type, but which of course if desired may be instead the electro-magnetic equivalent. The main magnetic field H exists in the vertical direction, while a radio-frequency coil 32 is arranged to supply a field with its axis into or out of the paper of the diagram, the R. F. field thus being perpendicular to the $H_0$ field. A pair of direct current coils 33 and 34, arranged as shown diagrammatically with respect to the magnet 31 and R. F. coil 32, may be provided to regulate the inhomogeneity of the field $H_0$, as explained at length in co-pending application Serial No. 384,741, filed October 7, 1953, now Patent No. 2,700,147, or to introduce additional field inhomogeneities as hereinafter set forth.

Figure 2:
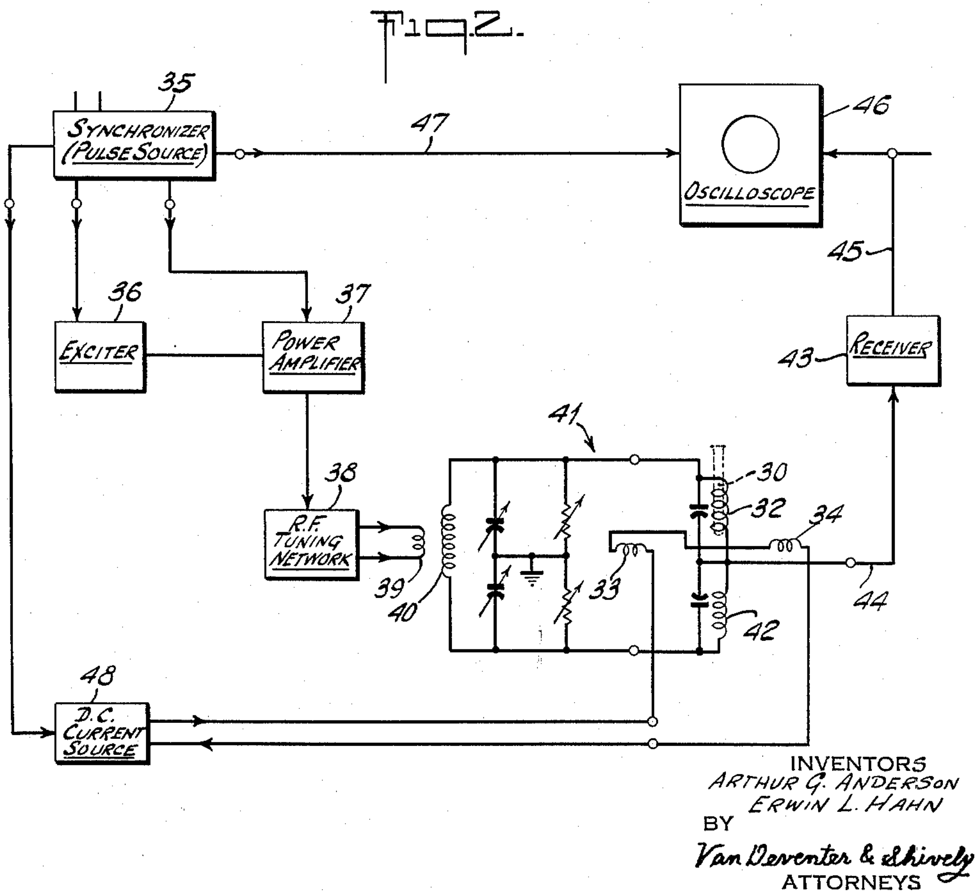

Figure 2 illustrates by semi-block diagram a typical electrical arrangement by which the impulses may be stored and echoes recovered from the sample 30. Inasmuch as the internal structures and modes of operation of the labelled block components are in general well known in the electronic art, description thereof will appropriately be limited to that necessary to explain the manner in which or with what modification they play their parts in carrying out the present invention.

A synchronizer or pulse generator 35 originates information and recollection pulses and other control pulses required by the system. The exciter unit 36, controllable by the pulse source 35 and comprising an oscillator and a plurality of frequency doubling stages, serves as a driving unit for the R. F. power amplifier 37. In the production of a pulse the source 35 first energizes the exciter 36 to place an R. F. driving signal on the amplifier 37, then "keys" the amplifier to produce an output signal therefrom. This output is routed via a tuning network 38 to a coil 39 which is inductively coupled to a second coil 40 adapted to supply energy to a bridge circuit network 41. One leg of the bridge circuit comprises the previously described R. F. coil 32, Fig. 1, while a second R. F. coil 42, identical with coil 32, forms the second or balancing leg. A signal amplifier or receiver 43 has its input conductor 44 connected to the network 41 between the coils 32 and 42. The output 45 of the amplifier 43 is directed to suitable apparatus for utilization of the echo pulses, such apparatus being illustrated herein by an oscilloscope 46 provided with a horizontal sweep control connection 47 with the synchronizer 35.

The sample 30 is contained within the R. F. coil as indicated. From the balanced bridge arrangement shown, it will be evident that R. F. pulses introduced via the coil 40 energize the coils 32 and 42 equally, so that while the sample 30 receives the desired input pulses, the centrally connected conductor 44 carries but little R. F. power to the amplifier 43. By this means, the sample 30 may be subjected to heavy R. F. power pulses without unduly affecting the signal amplifier. However, echo pulses induced by the sample 30 affect only the coil 32, so that by unbalance of the bridge such pulses are applied to the amplifier 43 as desired.

A D. C. current source 48, controllable by the synchronizer 35, is adapted to supply current to the coils 33 and 34 for field inhomogeneity regulation as previously noted.

In initiating spin-echo effects, the sample 30 is first subjected to the steady magnetic field $H_0$ for sufficient time to allow its gyromagnetic nuclei to become aligned as previously described. The sample is then subjected to two or more pulsed applications of an alternating magnetic field $H_1$, produced by R. F. alternating currents in the coil 32 and hence normal to the main field $H_0$. After a quiescent period the sample develops spontaneously a magnetic field of its own which is also normal to $\overline{H}_0$ and which rotates around the latter's direction. The strength of this rotating field builds up to a maximum and then decays, and if it is picked up inductively by a properly oriented coil (i. e., the coil 32), amplified and detected, it appears as an electrical pulse. This pulse is termed an "echo" of one of the previous pulses of the alternating magnetic field $H_1$, being directly related thereto as hereinafter explained.

Figure 3 illustrates two important ways of pulsing the field $H_1$ on and off when the combination is to be used as a memory device. In this connection certain suggestive names have been assigned to the various pulses, as shown on the diagram. The "echoes" are always considered to be distinctive echoes of the "information" or entering pulses. The "recollection" pulse is so called because it is applied whenever it is desired to obtain echoes of the information pulses, which latter are said to have been "stored" or "remembered" prior to the recollection pulse. As will be explained subsequently, echoes occur for physically differing reasons, and are thus properly distinguished as to type by different names. Two types illustrated are "mirror echoes" and "stimulated" echoes, these two types being associated with two distinct time symmetries in the operative cycle.

In Figure 3 the ordinate represents the voltage across the terminals of the R. F. coil 32 containing the sample, while the abscissa represents time. In order to make illustration feasible, the echo pulses have been drawn $10^5$ times larger than they would be on a scale of the ordinate which is suitable for drawing the information and recollection pulses. The duration of each information pulse may be of the order of a few microseconds, whereas the times $\tau$, which are the "memory" or "storage" intervals, may be for example of the order of seconds when water is used as a storage medium comprising the sample 30.

It will be seen that in the figure for mirror echoes the echo pulses and information pulses have mirror symmetry with respect to the center of the recollection pulse, $\tau$ being the memory time which can have any value from a few microseconds to several seconds.

In the case of stimulated echo production a "pre-pulse" precedes the introduction of the information pulses by time interval $\tau_1$, while the stimulated echo pulses follow the recollection pulse by the same interval $\tau_1$, and in the same order in which their corresponding information pulses were entered. Thus the figure for stimulated echoes has "translational" rather than mirror symmetry. The interval $\tau_2$ is the memory time, and has the same range as $\tau$, previously mentioned. Since $\tau_1$ can be made arbitrarily small, it is evident that stimulated echoes can be made to appear immediately after recall, and as noted above, they appear in the same order as the corresponding information pulses.

While the infinitely numerous individual inter-relationships among gyromagnetic nuclei lie in the field of quantum mechanics and obviously cannot be directly depicted, their macroscopic resultant effects employed in spin echo technique lend themselves to illustration by simplified mathematical models. To further clarify the difference between "mirror" echoes and "stimulated" echoes, the production of these two types will be described separately as follows:

*Mirror echoes*

Referring to Figure 4, it will be seen that the diagram presents a three-dimensional geometric figure having a vertical Z-axis and X and Y-axes defining a plane normal thereto. The Z-axis represents the direction of the main magnetic field $\overline{H}_0$ affecting the sample 30. In the case of $H_0$ and other symbols herein, it will be understood that the bar over the letter indicates the average value.

When the sample 30 has been subjected to the sole influence of the field $\overline{H}_0$ for sufficient time to align its spinning nuclei as previously described, a resultant or combined magnetic moment vector $\overline{M}_0$ exists in the Z and $\overline{H}_0$ direction.

An oscillatory field $2\overline{H_1\cos\omega_0}$ is applied to the sample 30 at right angles to $\overline{M}_0$ by means of the R. F. coil 32, this application comprising an "information" pulse, Fig. 3. At each point of the sample the linear oscillating magnetic field 2H$_1$ may be resolved into two component vectors of constant magnitude $H_1$ which rotate in opposite directions with angular velocity $\omega_0$. Due to the unidirectional spin of the nuclei whose magnetic moments make up the vector $\overline{M}_0$, the latter is conditioned to precess about $H_0$ in one direction. The R. F. field component which rotates in the precessional direction of $\overline{M}_0$ exerts a couple thereon which is constant in time, whereas the time average of the couple exerted by the other component is zero. The effect of the constant couple exerted by $\overline{H}_1$ on $\overline{M}_0$ is to tip $\overline{M}_0$ away from $\overline{H}_0$ through an angle $\theta=\gamma H_1 t$, where $t$ is the duration of the R. F. pulse. For illustration in Fig. 4 the angle $\theta$ is taken as 90°; so that $\overline{M}_0$ is rotated into the XY plane.

The direction initially assumed in the XY plane of $\overline{M}_0$ is designated in Fig. 4 by Y', with accompanying X' at right angles thereto. Since $\overline{M}_0$ is revolved synchronously by the R. F. field, the R. F. plane may be considered as revolving with the radian frequency $\overline{\omega}_0$. As will shortly appear, the echo effects produced are the results of changes in the relative angular directions of moment vectors in the revolving X'Y' field, so that the Y' axis, while actually revolving, is conveniently represented in the drawings as a stationary reference to make clear the nature of these relative changes.

At the termination of the R. F. information pulse the moments making up the vector $\overline{M}_0$ begin to precess about $\overline{H}_0$ at their own characteristic Larmor frequencies. However, since $\overline{M}_0$ is made up of the moments of gyromagnetic nuclei existing in different parts of the sample 30 and therefore influenced by differing strengths of the inhomogeneous magnetic field $\overline{H}_0$, these constituent moments precess at differing Larmor frequencies, as previously explained. Thus while the entire X'Y' system continues to rotate, the vector $\overline{M}_0$ no longer revolves therewith as a unit, but splits into constituents such as vectors *a* and *b*, Figure 5, having respectively greater and smaller angular velocities than a vector *c*, which latter has exactly the X'Y' plane rotational frequency $\overline{\omega}_0$. Thus, considering *c* as the vector of relatively stationary reference, it will be seen that vectors of higher precessional frequencies such as *a* draw away from *c* in one direction, while those of lower frequencies such as *b* draw away from *c* in the opposite direction. So long as this rotational divergence continues, the distribution of the various revolving moments in the X'Y' plane is such that they cannot come into coincidence so as to form an effective resultant moment.

Figure 8:
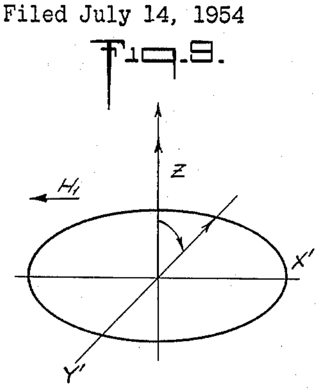

After a length of time $\tau$, assuming the moment vectors *a*, *b*, and *c*, to have assumed the relative positions shown in Fig. 5, they are subjected to another R. F. pulse of longer duration than the first, this pulse comprising the "recollection" pulse, Fig. 3. The effect of this pulse is to rotate the vectors through 180 degrees about the X-axis, that is, the X'Y' plane is flipped or "pan-caked." This action brings the various vectors into the positions shown in Fig. 6, their relative orientations being in mirror relation to those of Fig. 5. Since the vectors continue to precess in their original directions, it will be evident that *a* and *b* now converge toward *c* at the same rates at which they formerly diverged therefrom. Consequently, after a second time interval $\tau$ all the "fast" and "slow" vectors, represented by *a* and *b*, again come into coincidence with *c*. By this convergence the various moments reinforce each other to recreate a net magnetic moment $\overline{M}_0$ in the X'Y' plane, Fig. 7. Since $\overline{M}_0$ is rotating with angular veloctiy $\overline{\omega}_0$ relative to the coil 32, a signal is induced in this coil which is the "echo" of the first or "information" pulse applied to the sample. After the vector components of $\overline{M}_0$ attain the condition of coincidence, still precessing at their differing Larmor frequencies, they pass and spread out again as shown in Fig. 8, so that the echo signal dies out. The larger number of vectors in Fig. 8 are illustrative of the point that while for clarity in explanation only token vectors *a*, *b* and *c* were drawn in Figs. 5 and 6, the effect actually involves a huge number of such inter-acting moment vectors.

The foregoing explanation has demonstrated mirror spin-echo formation in the simplest case, i. e., the formation of a single echo of a single information pulse. Obviously the useful application of the technique normally involves multiple impulse storage and extraction, as illustrated in Fig. 3, but as this phase of the technique contains factors common to both mirror and stimulated echo production, it is appropriate that a brief description of stimulated echoes per se be inserted at this point.

*Stimulated echoes*

Figure 10:
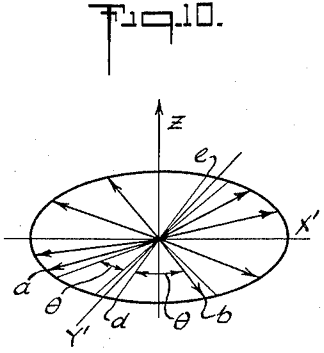

The "mirror echoes," just described, will be seen to occur when magnetic moment vectors which have been rotating in the XY plane are made to re-assemble in that plane. Thus it may be stated that the information is "stored in the XY plane." Information may also be stored along the Z-axis, in the following manner:

Referring to Fig. 9, somewhat similar to Fig. 4, the net magnetic moment $\overline{M}_0$ is tipped or rotated into the XY plane by a radio-frequency pulse of suitable strength and duration. This, however, is not an information pulse as applied in the former case, but the "pre-pulse" shown in the lower curve of Fig. 3. After the pre-pulse the differentially precessing constituent vectors of $\overline{M}_0$ spread around the XY plane and cover it more or less uniformly, as shown in Fig. 10.

After a time $\tau_1$ has elapsed, a second R. F. pulse (the "information" pulse) is applied. Just before this pulse, let us consider bundles of vectors labelled *a*, *b*, *d*, *e*, shown in Fig. 10. The bundle *a* itself contains individual vectors differing in precessional frequency in such a way that after having made one or more revolutions in the X'Y'-system they have arrived at the position shown. If the directions of each vector within bundle *a* were reversed at the instant shown in Fig. 10, they would all re-assemble at the position of $\overline{M}_0$ in Fig. 9.

Figure 11:
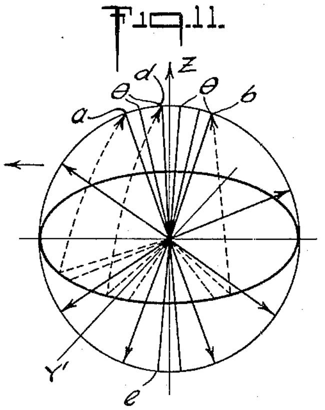

In the present illustration, the information pulse rotates all the vectors in the XY-plane through 90° about the X'-axis as shown in Fig. 11. From their positions as shown in Fig. 11, at the termination of the information pulse, the vectors of bundles *a* and *b* start precessing about the Z-axis with the different frequencies which they represent. They thus spread over the surface of a cone *ab* about the Z-axis as shown in Figure 12.

Still carrying out the simplest case of producing a single stimulated echo from a single information pulse, after an arbitrary period of time a third or "recollection" R. F. pulse is applied. This pulse rotates the axis of the cone *ab* into the X'Y'-plane as shown in Fig. 13. The significant fact at this stage is that all vectors of bundles *a* and *b* lie on the cone *ab*. They therefore start to re-assemble from angular positions which are not much different from the mirror image of the positions they had immediately prior to the application of the information pulse. This circumstance is illustrated in plan view in Fig. 14 for a particular vector A of the bundle *a*. Thus if the vector A is rotated into position A' it will assumedly return to the Y'-axis. Due to its movement on the cone it may return from A with the headstart $2\theta$. In the aggregate, the pulsed rotation of 180° about X' in going from the condition of Fig. 10 to that of Fig 12 is equivalent to reversing the directions of rotation of all the vectors.

After the period of time $\tau_1$, subsequent to the recollection pulse, the vectors of bundles *a* and *b* will have reassembled approximately as shown in Fig. 15. Vectors of bundle *a* will be upon the surface of the cone *a* and those of *b* will be on the surface of cone *b*. The total component along the Y'-axis is proportional to the projection of the constituents of cone *a* or *b* on its axis multiplied by the projection of this axis on the Y'-axis, that is to $\cos^2\theta$. Since cos 90° is zero, those bundles similar to *a* and *b* for which $\theta=90°$ give no net component.

Since this is the largest value of $\theta$ which need be considered (for $$\theta > \frac{\pi}{2}$$

$\theta$ is replaced by $(\pi - \theta)$ and the same results hold), it is evident that the component along the Y′ axis is never negative; hence a net must exist as the moments reassemble, and a "stimulated" echo signal appears. In contrast to the previously described XY plane storage in the case of a "mirror" echo, it will be seen that storage of the information in the present case prior to the recollection pulse was in the Z-direction, so that it may properly be designated as "Z-storage" or "Z-axis storage."

*Multiple-impulse storage*

The foregoing two sections having described how a single pulse of R. F. energy may be stored for periods of time, which may be for example as short as a few microseconds or as long as seconds. Figs. 16 and 17 illustrate the manner in which multiple pulses may be stored.

In the case of a single information pulse to produce a single echo by for example the mirror method as described, the angle $\theta$ through which the moment vector $\overline{M}_0$ was tipped by the R. F. information pulse was taken at the optimum value of 90°, bringing $\overline{M}_0$ into the XY-plane in a single operation. However, if the tipping angle $\theta$ be made less than 90°, it will be evident that $\overline{M}_0$ and consequently its component vectors nevertheless have their components in the XY-plane, which components may be utilized for echo production.

For purposes of analysis, let it be assumed that the sample 30 of material perfectly remembers a single pulse of information for a certain period of time, say $2T_r$, and then forgets. Consider that N echoes are to be produced during the time $T_r$. The maximum time for inserting information, if all the information is to be recalled, is then the first period $T_r$.

The process of conditioning the device to generate these N echoes is shown in Figs. 16 and 17 for the first and second pulses, the showing of course being a necessary illustrative simplification of the complex actual behavior of the physical materials, as previously pointed out. The first pulse tips $\overline{M}_0$ by the angle $\theta$ so that the moment $\overline{M}_0 \sin\theta$ appears in the X′Y′ plane. The corresponding echo will then be proportional to $\overline{M}_0 \sin\theta$. Following the termination of the first information pulse, in a period of time equal to one-half the duration of the subsequent echo, component vectors of $\overline{M}_0$ will have spread out over the X′Y′-plane so that no net vector exists in any direction, the lower plan view portion of Fig. 16 illustrating this spreading in progress. In illustrating a situation in which $\overline{M}_0$ first is tipped without spreading and then subsequently spreads it will be assumed that the subsequent echo is to be considerably longer than the duration of the information pulse.

The effect of the second pulse, illustrated in Fig. 17, is to rotate the plane P containing the vectors of the first pulse out of coincidence with the X′Y′ plane by the angle $\theta$ about the X′ axis. The vectors of this plane P spread over the surface of a segment of a sphere S, but all retaining projected components in the X′Y′-plane. Since the net component of these vectors along the Z-axis is zero, the second pulse also produces the component $(\overline{M}_0 \cos\theta) \sin\theta$ in the X′Y′ plane, setting up a second "family" of vectors in the latter plane for subsequent production of the second echo.

In the same manner, each additional information pulse, while establishing its "family" of effective vectors, at the same time affects the amplitude of those already entered. This relationship, which is a prime factor in determining the storage capacity of a spin-echo system, may be analyzed briefly as follows:

The sum of the lengths of the projections in the XY plane of the vectors in plane P is for small $\theta$, proportional to $$\cos\frac{\theta}{\sqrt{2}}$$

With N information pulses, the echo amplitudes $E_1$, $E_2$ . . . for the first, second, etc. information pulses will be $$E_1 = k\overline{M}_0 \sin\theta.\cos^{N-1}\frac{\theta}{\sqrt{2}}$$

$$E_2 = k\overline{M}_0 \cos\theta.\sin\theta.\cos^{N-2}\frac{\theta}{\sqrt{2}}$$

$$E_m = k\overline{M}\ \cos^{m-1}\theta.\sin\theta.\cos^{N-m}\frac{\theta}{\sqrt{2}}$$

Then for small $\theta$, the function $E_m$ is a maximum for $$\theta_m = \sqrt{\frac{2}{N+m}}$$

From the above equation for $E_1$ it can be seen that if $N=1$, a maximum E is obtained by having $\theta = 90°$, the optimum angle used in the previous explanation of single echo formation, Fig. 4. Thus calling this maximum echo amplitude $\hat{E}_1$, we have $$\hat{E}_1 = k\overline{M}_0$$

If the *m*th pulse is maximized other pulses obviously will not be a maximum. A good choice for $\theta$ is to maximize the Nth pulse, that is to choose $$\theta = \sqrt{\frac{1}{N}}$$

Then, for small $\theta$ and large N, $$\text{Max } E_N \approx \hat{E}_1 \frac{1}{\sqrt{N}}\left(1-\frac{1}{2N}\right)^N \approx \hat{E}_1\left(\frac{1}{e^{\frac{1}{2}}\sqrt{N}}\right) = \hat{E}_1\left(\frac{0.6}{\sqrt{N}}\right)$$

With this value of $\theta$ the first pulse is $$E_1 \approx \hat{E}_1 \frac{1}{\sqrt{N}}\left(1-\frac{1}{4N}\right)^N \approx \hat{E}_1\left(\frac{1}{e^{1/4}\sqrt{N}}\right) = \hat{E}_1\left(\frac{0.79}{\sqrt{N}}\right)$$

Thus, as additional pulses are entered in the storage time $T_r$, the maximum echo amplitude falls off as $$\frac{1}{\sqrt{N}}$$

By derivation similar to the foregoing, it may be shown that substantially the same condition applies in the case of stimulated as in mirror echo techniques.

In order to set forth most clearly the distinctive formation of mirror type and stimulated echoes, these phenomena necessarily have been described separately in their idealized or pure state, that is, as though each type of echo process were carried out without any presence of the other, and as though each information pulse and its echo were an externally unaffected combination. However, since as previously pointed out, the actual physical phenomena involve the inter-relationships among countless spinning nuclei, the effects described comprise what may be termed the dominant resultant manifestations, but are by no means the only effects present. Thus, while storing information pulses primarily for mirror echo production, secondary or partial Z-axis storage also occurs, and similarly, storage primarily for stimulated echo production may be accompanied by secondary partial mirror-echo effects. It will be obvious that such unwanted echo effects, if not eliminated, must exercise a deteriorating influence on the production of the predominant or desired echoes.

In practice, with multiple information pulse entry and echo formation, a limitation on the practical number of pulses may be set by the production of spurious echoes due to interpulse effects which raise the previously mentioned "noise level" of the system and affect the amplitude of the desired echo pulses. These inter-pulse effects ar largely a result of the action of each information pulse after the first upon the pulses which preceded it.

The manner in which the present invention provides for elimination of unwanted or spurious echoes while retaining the desired types is based on the previously explained fact that the two types of echoes differ basically in the method of their storage; i. e., the "mirror echo" information is stored in the XY plane, the "stimulated echo" information along or parallel to the Z-axis. The echo phase relationships between moment constituents stored along the Z-axis are unaffected by changes in magnetic field inhomogeneity for the reason that a change in local field merely shifts the constituent vectors of $a$, Fig. 12, upon the cone $ab$. Since these constituent vectors of $a$ are already uncertain in position (being anywhere on the cone), the rearranging of the vectors on this cone produces no net change.

In the case of the XY-plane storage, however, any changes in magnetic field affect the Larmor precessional frequencies of the constituent moments in accordance with the previously noted relation $\omega_0=\gamma H_0$. Therefore, introduction of an additional field inhomogeneity which is spatially dissimilar to the basic $H_0$ inhomogeneity can be used to destroy echo phase relationships in XY-plane while producing no significant effect on the Z-axis storage. In a like manner, field inhomogeneities may be introduced to restore the phase relationships of previously disorganized XY storage.

To illustrate briefly, if the static magnetic field $H_0$ varies across the sample 30, Fig. 1, and if the coils 33 and 34, when energized, produce a magnetic field which also varies across the sample, the static (with respect to 32 mc.) field at any point is given by $$H_0'=H_0+H_2f(t)$$

where $H_2$ is the field produced by the coils for unit current and $f(t)$ is a function of time. Suppose then, as illustrated in Fig. 18 A, B, that $f(t)$ has a value different from zero only during the time intervals shown. If $H_2f(t)$ is of sufficient amplitude and duration $\Delta t$ (i. e., if $H_2f(t)\Delta t$ changes by an amount of the order of 100 gauss microseconds across the sample), and if $$\frac{H_2}{H_0}$$

is not a constant, the echoes in both 18A, B are destroyed. This occurs because both types of echo storages are in the XY-plane after the recollection pulse $P_r$ and thus have their phase memories destroyed by the field pulse shown. If the field pulse is inserted instead at C, Fig. 18A, B, the phase memory of the "mirror echo" storage in Fig. 18A is still destroyed and no echoes will be produced therefrom, while the "stimulated echoes" are unaffected by this field pulse since their storage is along the Z-axis at the time the pulse is applied.

Figures 19A and 19B are typical time diagrams illustrating the related applications of the above effects. Referring first to Fig. 19A, wherein the echoes to be preserved are of the mirror type, and assuming the presence of unwanted Z-axis storage (due to inter-pulse effects, for example), "discriminator pulses" or field inhomogeneity pulses are introduced at the times shown. These pulses are of the same amplitude and duration, and may be inserted anywhere within the duration of the intervals or time zones C, C′ as indicated. So far as the mirror echoes are concerned, the effect of the first pulse, in time, is to systematically disorganize the phase memories of the echo storage, while the effect of the second pulse is to systematically reorganize the phase memories. The mirror echoes therefore are not harmed. The Z-axis storage, for the reasons previously noted, is unaffected by the first discriminator pulse, but such of this Z-axis storage as is read out by the recollection pulse is destroyed by the second discriminator pulse.

In the case of desired "stimulated echoes," Fig. 19B, a single discriminator pulse may be introduced anywhere within the interval or time zone C. This pulse destroys echo material in XY storage at this time, but does not affect the Z-axis storage, so that only stimulated echoes are read out, as desired. The same objective may be accomplished by means of two discriminator pulses as shown in the optional $f(t)$. In this case the first pulse, introduced anywhere within zone $a$, systematically disorganizes the phase memory from which stimulated echoes are later to be obtained, while the second pulse, anywhere within zone $a'$, systematically reorganizes this phase memory. The XY storage (i. e., storage which would normally produce mirror echoes) is unaffected by the first discriminator pulse, which pulse occurs before the information has been stored, but such of this "mirror" storage as is read out by the recollection pulse is destroyed by the second recollection pulse before it can form echoes.

As an extension of the procedure of Fig. 19A and B, Fig. 19C illustrates a method for the selection, following the recollection pulse $P_r$, of either "mirror" or "stimulated" echo read out. This is accomplished by making the prepulse $P_p$ less than 90° (say 45°), and the recollection pulse $P_r$ less than 180° (say 135°), under which circumstances the output will be as shown in Fig. $19C_1$, where no discriminator pulses are used. Figures $19C_2$ and 19C show that with a fixed discriminator pulse introduced at C, the introduction or omission of a duplicate pulse at C′ or $a'$ respectively causes either "mirror" or "stimulated" echoes of the original information pulses to be read out.

From the foregoing explanation it will be seen that "mirror" symmetry of the discriminator pulses about the recollection pulse and "translational" symmetry from prepulse-information to recollection-echoes are sufficient conditions for preservation respectively of either mirror or stimulated echoes. It will also be understood that in the description and claims, the expressions "phase memory" or "phase relationship" refer to this memory or relationship with respect to the $H_0$ polarizing field. In all cases of the present invention the method is to destroy the phase memory with respect to $H_0$ (i. e., the ability to form an echo under precession in $H_0$) of undesired echo storage, while manipulating the discriminator pulses in such fashion that previous to echo time the phase memory with respect to $H_0$ leading to the desired echoes is preserved.

While for illustration, disorganization and reorganization of constituents of echo storage have been shown as accomplished by field pulses of the same direction, it is also possible to reorganize systematically by means of pulses of opposite polarity introduced at appropriate times. Similarly for simplicity in illustration, where two discriminator pulses were used these pulses were assumed as of the same amplitude and duration. In this respect, however, it will be evident by reviewing the effect of these pulses on memory, that it is only necessary that the amplitude-time area of the two pulses be the same (within an accuracy of say 2 gauss-microseconds). Furthermore, while the method has been described in detail respecting magnetic moments in a magnetic polarizing field, it will be obvious to those skilled in the art that it may similarly be applied to nuclear electric moments in an electric field.

From the foregoing description it will be seen that the present invention provides a selective method of eliminating "noise" and interference due to the presence of unwanted storage in a memory sequence, removing unwanted effects while preserving the desired echo signals in their purest and hence most effective state, and further provides for selective read out of either type of echoes from deliberately concurrent storage of both types. While the method has been set forth in preferred form, it is also evident that the invention is not limited to the precise relationships illustrated, as obviously various modifications may be employed without departing from the scope of the appended claims.

We claim:

1. That method of information storage and recovery in a sequence involving systematic precessional phase disassembly and subsequent systematic reassembly among associated moments of spinning nuclei in a polarizing field, which includes the steps of establishing two differing phase memory conditions among said precessing nuclear moments with respect to said field, selectively pulsing said field in inhomogeneity to destroy either of said phase memory conditions while retaining the other, whereby only those of said moments associated with said other phase memory condition may be systematically reassembled to mutual reinforcement to form echo pulses, and detecting said echo pulses.

2. A method according to claim 1 wherein said sequence includes application of a torsional recollection pulse to said nuclei to establish said systematic reassembly, and wherein said field inhomogeneity pulsing is applied in differing selected time relations to said recollection pulse.

3. In an information storage and recovery system within a magnetic field involving concurrently established gyromagnetic nuclear storage conditions in a direction parallel to the direction of said field and in a plane normal to said field direction and further including a recollection pulse to establish subsequent recovery of said stored information as echo pulses, that method of selectively limiting said echoes to the result of either one of said types of stored information which includes the steps of pulsing said field in inhomogeneity in a time zone immediately preceding said recollection pulse to destroy said normal-plane storage while retaining said parallel storage, and alternatively pulsing said field in inhomogeneity in said time zone and in a second time zone immediately following said recollection pulse to re-establish said normal-plane storage while destroying said parallel storage.

4. In a spin-echo information storage and recovery sequence in a magnetic field and including two concurrent storage conditions having differing essential combinational time and field inhomogeneity relationships with said field within said sequence, that method of effecting informational reproduction from a selected one of said storage conditions which includes the steps of pulsing said field in inhomogeneity in accord with said time-field relationship of said selected storage condition and in disaccord with said time-field relationship of said other storage condition, whereby said selected storage condition alone may progress to form echo pulses in said sequence, and detecting said echo pulses.

5. In an information storage and recovery sequence including concurrent establishment in a magnetic field of nuclear gyromagnetic storage conditions initially in a Z-axis direction parallel to the direction of said field and in an XY-plane normal to said field direction, and further including a torsional radio-frequency magnetic recollection pulse to initiate subsequent recovery of said stored information as magnetic echo pulses, said recollection pulse being adapted to convert said Z-axis storage to XY-plane storage, that method of producing echoes from one of said storage conditions to the exclusion of the other which includes the steps of magnetically pulsing said field in pre-determined selective time zonal relationship to said recollection pulse for destroying said other storage condition while carrying said first storage condition unimpaired into said subsequent echo pulse formation, and inductively detecting said echo pulses.

6. A method according to claim 5 wherein said field pulsing step includes applying a discriminator pulse of magnetic inhomogeneity to said field in a time zone following said establishment of said two storage conditions and prior to said recollection pulse to disorganize said XY-plane storage condition, said Z-axis storage condition being insensitive to said field inhomogeneity pulse in said time zone, whereby said echo pulse formation may result solely from said initially Z-axis storage condition.

7. A method according to claim 5 wherein said field pulsing step includes applying a discriminator pulse of magnetic inhomogeneity to said field in a time zone following said establishment of said two storage conditions and prior to said recollection pulse to systematically disorganize said initial XY-plane storage condition, said Z-axis storage condition being insensitive to said field inhomogeneity pulse in said time period, and including the step of applying a second discriminator pulse of magnetic inhomogeneity to said field in a time zone following said recollection pulse and before said echo pulse formation, to systematically reorganize said initial XY-plane storage condition while disorganizing said converted initially Z-axis storage condition, whereby said echo pulse formation may result solely from said initially XY-plane storage condition.

8. A method according to claim 5 wherein said sequence includes a radio-frequency nuclear conditioning pre-pulse applied prior to establishment of said storage conditions, and wherein said field pulsing step includes applying a first discriminator pulse of magnetic inhomogeneity to said field in a time zone between said pre-pulse and said establishment of said storage conditions and applying a second discriminator pulse of magnetic inhomogeneity to said field in a time zone subsequent to said recollection pulse and prior to the time of said echo pulse formation, whereby said echo pulse formation may result solely from said initially Z-axis storage condition.

9. A method according to claim 5 wherein said sequence includes a radio-frequency nuclear conditioning pre-pulse applied prior to establishment of said storage conditions, and wherein said field pulsing step includes applying a pulse of magnetic inhomogeneity to said field subsequently to said establishment of said storage conditions and prior to said recollection pulse.

No references cited.